United States Patent [19]

Thomas et al.

[11] 4,085,294

[45] Apr. 18, 1978

[54] CONTROL POINT DRIVER CIRCUIT

[75] Inventors: Robert M. Thomas, Maitland; John A. Gauthier, Brockville, both of Canada

[73] Assignee: GTE Automatic Electric (Canada) Ltd., Brockville, Canada

[21] Appl. No.: 711,019

[22] Filed: Aug. 2, 1976

[51] Int. Cl.$^2$ ............................................. H04M 3/00
[52] U.S. Cl. .............................. 179/16 AA; 179/18 G
[58] Field of Search ............... 179/16 A, 18 E, 18 G, 179/18 GE, 18 GF, 18 FA, 16 AA; 361/186, 194

[56] References Cited

U.S. PATENT DOCUMENTS

| 3,832,495 | 8/1974 | Hovagimyan et al. | 179/18 GF |
| 3,936,612 | 2/1976 | Hjortendal et al. | 179/18 GE |
| 3,976,845 | 8/1976 | Ashley | 179/18 GF |

Primary Examiner—Kathleen H. Claffy
Assistant Examiner—Randall P. Myers

[57] ABSTRACT

A control point driver circuit for use in a telephone exchange for energizing and deenergizing a control element such as a control relay in response to set and reset input pulses. The control point driver circuit comprises a transformer having a centertapped primary forming set, reset, and common inputs for receiving the set and reset input pulses and a secondary coupled to a constant control voltage. The control point driver circuit also includes a comparator having a first input coupled to the transformer secondary, an output coupled to the control relay to be energized and de-energized and a second input coupled to the comparator output for receiving first and second reference voltages which are related in magnitude to the constant control voltage to maintain the comparator in the set state or reset state indefinitely until a reset or set input pulse is received. A received input pulse causes an induced voltage within the transformer secondary which augments the control voltage to change the relation in magnitude between the reference voltages and the control voltage to cause the comparator to change states in response to the received set and reset input pulses. When the comparator is in the set state, the control relay is energized and when the comparator is in the reset state, the control relay is de-energized.

6 Claims, 1 Drawing Figure

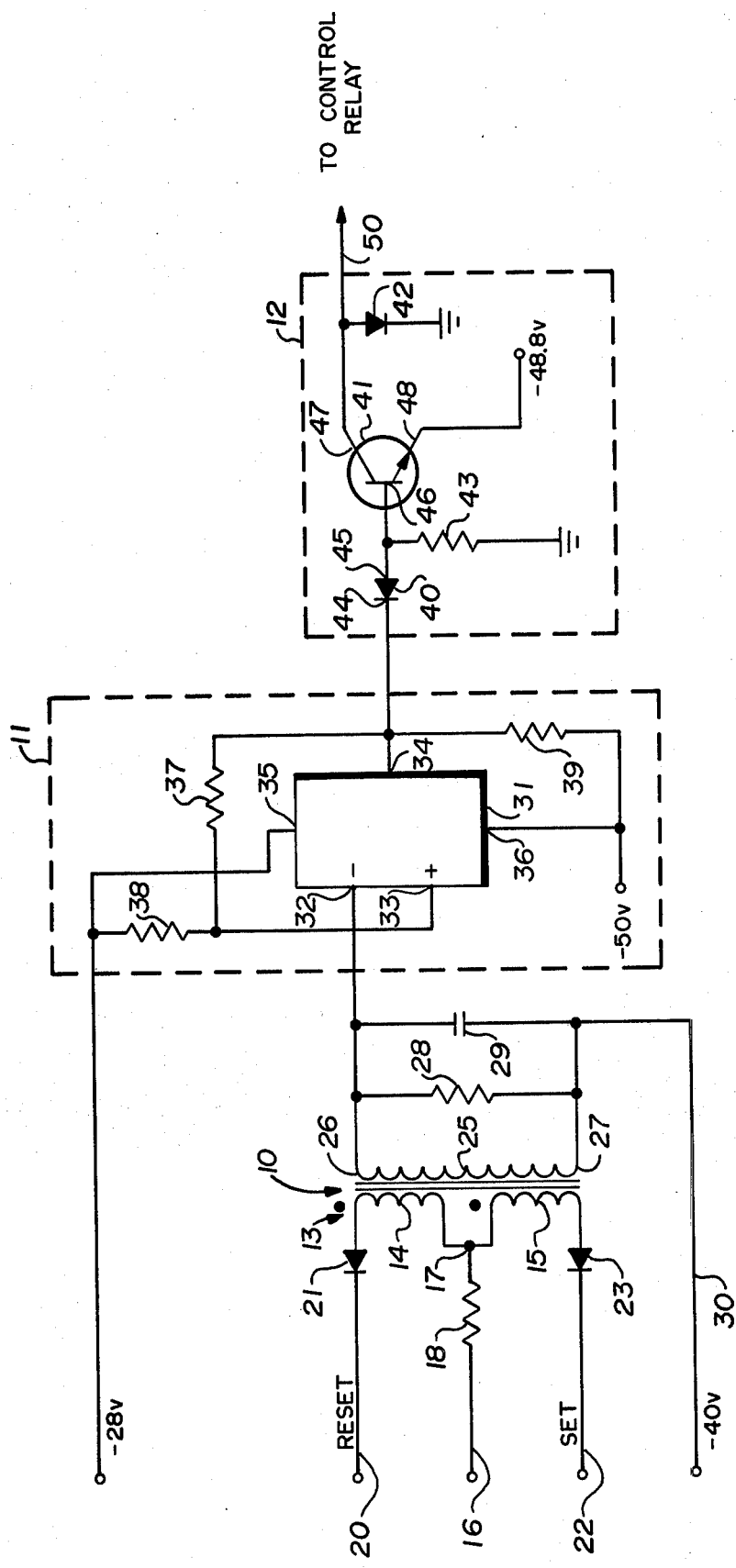

CONTROL POINT DRIVER CIRCUIT

BACKGROUND OF THE INVENTION

The present invention is generally directed to a control point driver circuit and is particularly directed to a control point driver circuit for use in a telephone exchange for energizing and de-energizing a control relay in response to set and reset input pulses.

Control point driver circuits are well known in the art and find general application in telephone exchanges for energizing and de-energizing control relays. Reference to such circuits is found in an article by Edward M. Horiuchi and Otto J. Kohout, "#2 EAX Techniques," *GTE Automatic Electric Technical Journal*, volume 15 no. 3, July, 1976, pages 156–158. It is advantageous for such control point driver circuits to be bi-stable in nature so that a continuous input pulse is not required for holding a control element such as a control relay energized or de-energized. Unfortunately, such control point driver circuits suffer from being sensitive to supply line noise which gives rise to inadvertant energizing or de-energizing of the control relays or are quite complicated requiring a substantial number of discrete components. Control point driver circuits of the prior art have also lacked repeatability and stability in the triggering threshold levels. Also, control point driver circuits of the prior art have lacked sufficient electrical isolation between the set and reset control pulses and the control point itself. This is important because this factor adds substantially to its noise immunity, particularly where large ground-potential differences exist between the control point driver circuit and the circuits which supply the control set and reset pulses. Additionally, such control point driver circuits do not facilitate the required degree of decoupling in order to afford reliable service.

It is therefore a general object of the present invention to provide a new and improved control point driver circuit for use in a telephone exchange.

It is a more particular object of the present invention to provide a control point driver circuit which is substantially less complicated than control point driver circuits which have come before.

It is a still further particular object of the present invention to provide a control point driver circuit for use in a telephone exchange for energizing and de-energizing a control relay which substantially precludes noise from affecting its operation.

It is a still more further particular object of the present invention to provide a new and imporved control point driver circuit which affords improved repeatability and stability of the triggering threshold level.

SUMMARY OF THE INVENTION

The invention provides a control point driver circuit for use in a telephone exchange for energizing and de-energizing a control element in response to set and reset pulses respectively. The control point driver circuit comprises a transformer comprising a centertapped primary, a common input at the centertap, a reset input for receiving the reset input pulses between the reset input and the common input, and a set input for receiving the set input pulses between the set input and the common input, and a secondary. The control point driver circuit additionally comprises control voltage means coupled to the secondary for providing at the secondary a fixed control voltage in the absence of a set or reset input pulse and for providing at the secondary in combination with induced transformer voltages, a first augmented control voltage in the presence of a reset input pulse and a second augmented control voltage in the presence of a set input pulse. The control point driver circuit further includes a bi-stable means including a comparator having an output coupled to the control relay, the comparator being capable of assuming a set state to energize the control element and a reset state to deenergize the control element, the comparator also having a first input coupled to the secondary and responsive to the fixed control voltage to maintain the set or reset state in the absence of a set or reset pulse, and also responsive to the first augmented control voltage to assume the reset state and to the second augmented control voltage to assume the set state.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the companying drawing, in which the single FIGURE is a schematic circuit diagram of a control point driver circuit embodying the present invention.

DESCRIPTION OF THE PREFERRED EMBODIMENT

Referring now to the sole FIGURE, the control point driver circuit thereshown includes a transformer 10, a bistable means 11, and a driving means 12.

Transformer 10 has a centertapped primary 13 which includes a first winding 14 and a second winding 15. The first winding 14 and second winding 15 are wound in the same direction as indicated by the dotted nomenclature. The centertapped primary therefore forms a common connection 17 between the first coil 14 and the second coil 15 which is coupled to a common input 16 by resistor 18. A reset input 20 is coupled to winding 14 by isolating diode 21. In a like manner, a set input 22 is coupled to winding 15 by isolating diode 23. The common input 16, reset input 20, and set input 22 receive the set and reset pulses which are acted upon by the control point driver circuit for energizing and de-energizing a control relay.

The set and reset input pulses are preferably positive pulses and produce a primary current of 300 ma when applied to the common input 16. Current limiting is provided by external circuitry which control the reset input 20 and set input 22. When a reset input is to be applied to the control point driver circuit of the sole FIGURE, reset input 20 is enabled and the positive going pulse is applied to the common input 16. In a similar manner, when a set pulse is applied, the positive going pulse is applied to the common input 16 while the set input 22 is enabled.

Transformer 10 also includes a secondary 25 which has a first end 26 and a second end 27. Secondary winding 25 is wound in an opposite direction relative to primary windings 14 and 15 as indicated by the dotted nomenclature. Hence, a positive reset input pulse applied across common input 16 and reset input 20 will induce a positive voltage at first end 26 and a positive set input pulse applied to the common input 16 relative to set 22 will induce a negative voltage at end 26.

Coupled to the second end 27 of secondary 25 is a control voltage means including line 30. Line 30 is provided with a substantially constant control voltage by a power supply of conventional design which voltage may be preferably minus forty volts for reasons to be explained hereinafter. The substantially constant voltage on line 30 is therefore present at the first end 26 of secondary 25.

Bistable means 11 comprises a comparator 31 having a first input 32, a second input 33, and an output 34. Comparator 31 also has power supply inputs 35 and 36 which are coupled to −28 volt and −50 volt power sources respectively. Comparator 31 is preferably an LM 339 voltage comparator of the type well known in the art and commercially available. Bistable means 11 also includes a resistor 37 which couples the output 34 to the second input 33, a resistor 38 which couples the second input 33 to the −28 volt power source and resistor 39 coupled between the output 34 of comparator 31 and the −50 volt power source. Input 32 is coupled to the secondary 25 at first end 26.

Resistors 37 and 38 form a voltage divider and because resistor 37 couples output 34 to the second input 33 a first reference voltage is established at input 33 when comparator 31 is in the set state and a second reference voltage when comparator 31 is in the reset state. When comparator 31 is in the set state, output 34 will be at approximately −39.3 volts which results in a first reference voltage of −38.6 volts at input 33. Recalling for a moment that a constant voltage of −40 volts is being supplied to input 32, the first reference voltage at input 33 is more positive than the control voltage at input 32 so that comparator 31 will remain in the set state indefinitely until a reset input pulse is received across inputs 16 and 20. When comparator 31 is in the reset state output 34 will be at −50 volts which will result in a second reference voltage of −41.4 volts at input 33. Thus, when comparator 31 is in the reset state, input 33 is less positive than input 32 and the comparator will remain in the reset state until a set input pulse is received between inputs 16 and 22.

Driving means 12 comprises diodes 40 and 42, transistor 41, and resistor 43. Diode 40 has a cathode 44 coupled to output 34 of comparator 31 and an anode 45 coupled to base 46 of transistor 41. Base 46 is coupled to ground by resistor 43. Collector 47 of transistor 41 is coupled to a control element such as a control relay as indicated by the arrow 50 to be energized and de-energized. The control point driver circuit of the present invention could also be used to control an indicator lamp, audible signal circuit or the like as well. Collector 47 is also coupled to ground by diode 42. Emitter 48 of transistor 41 is coupled to a −48.8 volt power source.

When comparator 31 is in the set state, output 34 is at −39.3 volts and by virtue of the −48.8 volts at emitter 48, diode 40 will be back biased allowing transistor 41 to be forward biased allowing current to be conducted through the control relay and thus for energizing the control relay.

When comparator 31 is in the reset state, output 34 will be at −50 volts and diode 40 will thereby be forward biased causing transistor 41 to turn off. Thus, transistor 41 no longer conducts current and the control relay is de-energized.

In operation, and assuming that comparator 34 is in the set state, input 32 will be at −40 volts and input 33 will be at −38.6 volts. Thus, input 33 is more positive than input 32 and the comparator will remain in the set state indefinitely until a reset pulse is received between inputs 16 and 20.

When the positive going reset pulse is received at input 16 relative to input 20, a positive voltage is induced across secondary winding 25 which appears at the first end 26. Thus, the constant control voltage of −40 volts is augmented by the voltage induced in the transformer due to the reset pulse and results in a first augmented control voltage which increases from −40 volts in the positive direction. When the first augmented control voltage at input 32 becomes more positive than the first reference voltage at input 33, comparator 31 will change to the reset state to thereby de-energize the control relay in the manner previously described.

Now that comparator 31 is in the reset state, input 33 will be at −41.4 volts and input 32 will be at the constant voltage of 40 volts. Because input 33 is less positive than input 32, the comparator will remain in the reset state indefinitely until a set input pulse is received across inputs 16 and 22.

When the positive going set input pulse is received at input 16 relative to input 22, a negative voltage will be induced across winding 25 which will appear at the first end 26 to result in a second augmented control voltage which is negative going from the −40 volt constant control voltage. When the second augmented control voltage at input 32 becomes more negative than the second reference voltage of −41.4 volts at input 33, comparator 31 will once again change states back to the set state to energize the control relay.

From the foregoing, it may be recognized that the first reference voltage is more positive than the constant control voltage and the second reference voltage is less positive than the constant control voltage by equal and predetermined voltage differentials of 1.4 volts. Thus, for noise to be effective in changing the state of comparator 31, the noise must appear at input 32 as a change of 1.4 volts from the −40 volts constant control voltage. In order to accomplish this, the noise must be sufficiently large which is evident by the fact that in the preferred from, the set and reset positive going input pulses should produce a primary current of approximately 300 ma. Noise of that magnitude is generally not present.

To further preclude noise from effecting the operation of comparator 31, filter means comprising resistor 28 and capacitor 29 are coupled across the first and second ends 26 and 27 respectively. The filter means comprising resistor 28 and capacitor 29 reduces the response speed of the secondary to induced voltages to thereby further preclude noise voltages at the inputs from effecting the operation of the comparator.

The present invention therefor provides an improved control point driver circuit for use in a telephone exchange for energizing and de-energizing a control relay in response to set and reset input pulses. The control point driver circuit is rendered greatly simplified because a comparator is configured as a bistable element and is utilized as the main control component. Also because a comparator is used as the main control means, improved repeatability and stability in the required triggering threshold levels is obtained. Furthermore, the control point driver circuit of the present invention is virtually noise immune because a given magnitude of noise induced currents in the order of 300 ma would be required to inadvertently change the state of the comparator. The driving means herein described sufficiently isolates the output of the comparator from the control relay to assure that the control relay will be energized and de-energized in a reliable manner.

While a particular embodiment of the invention has been shown and described, modifications may be made, and it is intended in the appended claims to cover all such modifications which fall within the true spirit and scope of the invention.

What is claimed is:

1. A control point driver circuit for use in a telephone exchange for energizing and de-energizing a control element in response to set or reset input pulses respectively, said control point driver circuit comprising:

a transformer comprising a centertapped primary winding, a common input at said centertap, a reset input for receiving the reset input pulses between said reset input and said common input, and a set input for receiving the set input pulses between said set input and said common input, said transformer also including a secondary winding;

control voltage means coupled to said secondary winding for providing at said secondary winding a fixed control voltage in the absence of a set or reset input pulse and for providing at said secondary winding in combination with induced transformer voltages a first augmented control voltage in the presence of a reset input pulse and a second augmented control voltage in the presence of a set input pulse; and bistable means including a voltage comparator having first and second input terminals and an output terminal for comparing the voltage level at said first input terminal and the voltage level at said second input terminal, said voltage comparator assuming a set state thereby generating a set output signal at said output terminal when said voltage levels at said first and second input terminal have a first predetermined relationship and assuming a reset state thereby generating a reset output signal at said output terminal when said voltage levels at said first and second input terminals have a second predetermined relationship, said first input terminal coupled to said secondary winding, said bistable means further including first circuit means connected between said second input terminal and said output terminal for supplying a first reference voltage at said second terminal when said set output signal is present and for supplying a second reference voltage at said second terminal when said reset output signal is present, second circuit means connecting said output terminal to said control element.

2. A control point driver circuit in accordance with claim 1 wherein said centertapped primary comprises first and second windings, wherein said reset input is at said first winding and wherein said set input is at said second winding.

3. A control point driver in accordance with claim 2 wherein said transformer secondary has first and second ends, and wherein said first end is coupled to said comparator first input terminal and said second end is coupled to said control voltage means.

4. A control point driver circuit in accordance with claim 1 wherein said first reference voltage is more positive than said fixed control voltage when said comparator is in the set state to maintain said comparator in the set state in the absence of a reset input pulse, and said second reference voltage is less positive than said fixed control voltage when said comparator is in the set state to maintain said comparator in the reset state in the absence of a set input pulse.

5. A control point driver circuit in accordance with claim 4 wherein said first reference voltage is more positive than said fixed control voltage and said second reference voltage is less positive than said fixed control voltage by equal an predetermined voltage differentials to thereby preclude noise voltages up to a given magnitude at said reset and set inputs from inadvertently causing said comparator to change states.

6. A control point driver circuit in accordance with claim 5 wherein said secondary winding comprises first and second ends, wherein said first end is coupled to said first input terminal, wherein said second end is coupled to said control voltage means, and wherein said control point circuit additionally comprises filter means coupled between said first and second secondary ends for reducing the response speed of said secondary to induced voltages to thereby further preclude noise voltages from effecting said comparator.

* * * * *

UNITED STATES PATENT AND TRADEMARK OFFICE
CERTIFICATE OF CORRECTION

PATENT NO. : 4,085,294
DATED : April 18, 1978
INVENTOR(S) : ROBERT M. THOMAS and JOHN A. GAUTHIER It is certified that error appears in the above-identified patent and that said Letters Patent are hereby corrected as shown below:

Column 6, line 24, "set" should be --reset--

Column 6, line 31, "an" should be -- and --.

Signed and Sealed this

Seventh Day of November 1978

[SEAL]

Attest:

RUTH C. MASON
Attesting Officer

DONALD W. BANNER
Commissioner of Patents and Trademarks